US010071374B2

(12) United States Patent
Michienzi et al.

(10) Patent No.: US 10,071,374 B2
(45) Date of Patent: Sep. 11, 2018

(54) APPARATUS AND METHODS FOR CREATING A STATIC AND TRAVERSING THERMAL GRADIENT ON A MICROFLUIDIC DEVICE

(71) Applicant: Waters Technologies Corporation, Milford, MA (US)

(72) Inventors: Joseph D. Michienzi, Plainville, MA (US); James P. Murphy, Franklin, MA (US); Michael O. Fogwill, South Grafton, MA (US); Keith Fadgen, Hope Valley, RI (US); Geoff Gerhardt, Woonsocket, RI (US); Gary W. Bertone, Southborough, MA (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 0 days.

(21) Appl. No.: 14/904,135

(22) PCT Filed: Aug. 4, 2014

(86) PCT No.: PCT/US2014/049616

§ 371 (c)(1),
(2) Date: Jan. 11, 2016

(87) PCT Pub. No.: WO2015/020963

PCT Pub. Date: Feb. 12, 2015

(65) Prior Publication Data

US 2016/0167048 A1 Jun. 16, 2016

Related U.S. Application Data

(60) Provisional application No. 61/862,154, filed on Aug. 5, 2013.

(51) Int. Cl.

| | |
|---|---|
| ***B01D 1/02*** | (2006.01) |
| ***B01L 3/00*** | (2006.01) |
| ***B01L 7/00*** | (2006.01) |

(52) U.S. Cl.

CPC ..... *B01L 3/502715* (2013.01); *B01L 3/50273* (2013.01); *B01L 3/502707* (2013.01);

(Continued)

(58) Field of Classification Search

CPC .................................... B01D 1/02; B01L 3/00

(Continued)

(56) References Cited

U.S. PATENT DOCUMENTS 5,227,596 A 7/1993 McGaffigan et al.
6,174,675 B1 * 1/2001 Chow et al. ................ 435/6.19

(Continued)

FOREIGN PATENT DOCUMENTS

WO 2008061129 A2 5/2008
WO 2011126892 A2 10/2011

OTHER PUBLICATIONS

International Search Report & Written Opinion in International Patent Application No. PCT/US14/49616, dated Oct. 30, 2014; 12 pages.

(Continued)

*Primary Examiner* — Brian J Sines

(74) *Attorney, Agent, or Firm* — Schmeiser, Olsen & Watts LLP

(57) ABSTRACT

A microfluidic device, for use in separation systems, includes a substrate having a fluidic channel. One or more heaters made of a thick film material are integrated with the substrate and in thermal communication with the fluidic channel of the substrate. The one or more heaters produce a thermal gradient within the fluidic channel in response to a current flowing through the one or more heaters. A plurality (Continued)

of electrically conductive taps can be in electrically conductive contact with the one or more heaters. The plurality of electrically conductive taps provides an electrically conductive path to the one or more heaters by which an electrical supply can produce the current flowing through the one or more heaters. Alternatively, the thick film material can be ferromagnetic, and the electrical supply can use induction to cause the current to flow through the one or more heaters.

16 Claims, 12 Drawing Sheets

(52) U.S. Cl.
CPC ........... *B01L 3/502761* (2013.01); *B01L 7/54* (2013.01); *B01L 2200/0652* (2013.01); *B01L 2200/12* (2013.01); *B01L 2300/0883* (2013.01); *B01L 2300/1805* (2013.01); *B01L 2300/1811* (2013.01); *B01L 2300/1894* (2013.01)

(58) Field of Classification Search
USPC .............. 422/68.1, 502, 503, 509, 530, 554; 436/43, 147
See application file for complete search history.

(56) References Cited

U.S. PATENT DOCUMENTS 6,663,697 B1 * 12/2003 Kottenstette ....... G01N 30/6095 73/23.39
6,666,907 B1 * 12/2003 Manginell .......... G01N 30/6095 73/23.36
6,807,340 B2 10/2004 Postolek et al.
2002/0150683 A1 10/2002 Troian et al.
2003/0142911 A1 7/2003 Postolek et al.
2004/0043479 A1 5/2004 Briscoe et al.
2005/0274174 A1 * 12/2005 Tai ......................... G01N 30/30 73/61.57
2007/0122819 A1 5/2007 Wu et al.
2009/0123336 A1 * 5/2009 Yang et al. .................. 422/68.1
2010/0116147 A1 5/2010 Chung et al.
2010/0285975 A1 * 11/2010 Mathies et al. ................... 506/7
2011/0143952 A1 6/2011 Lewis et al.
2012/0142010 A1 * 6/2012 Mathies et al. .............. 435/6.12
2012/0304746 A1 12/2012 Gerhardt

OTHER PUBLICATIONS

Zhao, et al., "Characteristics of TGPGC on Short Micro Packed Capillary Column", Analytical Sciences, Jan. 2002, vol. 18, The Japan Society for Analytical Chemistry.
International Preliminary Report on Patentability in related International Patent Application No. PCT/US14/49616, dated Feb. 18, 2016; 11 pages.
Extended Search Report in counterpart European Patent Application No. 14834260.3, dated May 11, 2017; 12 pages.
Partial Supplementary European Search Report in counterpart European Patent Application No. 14834260.3, dated Feb. 6, 2017; 8 pages.

* cited by examiner

APPARATUS AND METHODS FOR CREATING A STATIC AND TRAVERSING THERMAL GRADIENT ON A MICROFLUIDIC DEVICE

RELATED APPLICATION

This application claims the benefit of and priority to U.S. provisional application No. 61/862,154, filed Aug. 5, 2013, titled "Methods for Creating a Static and Traversing Thermal Gradient on a Microfluidic Device," the entirety of which application is incorporated by reference herein.

FIELD OF THE INVENTION

The invention relates generally to apparatus and methods for establishing static and traversing thermal gradients along microfluidic devices.

BACKGROUND

The electronics industry routinely uses thick film pastes to produce conductors, resistors, and dielectrics for a multitude of applications. The pastes can be screen printed directly to non-conductive materials, or, for conductive materials, printed over a previously applied dielectric layer. Thick film pastes can also be embedded in a co-fireable material, such as ceramics.

SUMMARY

All examples and features mentioned below can be combined in any technically possible way.

In one aspect, the invention features a microfluidic device for use in separation systems. The microfluidic device comprises a substrate having a fluidic channel and one or more heaters made of a thick film material integrated with the substrate and in thermal communication with the fluidic channel of the substrate. The one or more heaters produce a thermal gradient within the fluidic channel in response to a current flowing through the one or more heaters.

Embodiments of the microfluidic device may include one of the following features, or any combination thereof.

The microfluidic device may further include a plurality of electrically conductive taps in electrical communication with the one or more heaters. The plurality of electrically conductive taps provides an electrically conductive path to the one or more heaters by which an electrical supply can produce the current flowing through the one or more heaters. One or more heaters are made of a thick film material formed within or on the substrate. At least one heater of the one or more heaters may be trapezoidal in shape with a narrow end and a wide end, wherein the trapezoidal shape of the at least one heater produces a warm-to-cool thermal gradient from the narrow end to the wide end.

Further, at least one heater of the one or more heaters may be comprised of a plurality of spatially separated heater segments connected in series by a plurality of electrically conductive taps. Each heater segment is electrically connected to one or more of the electrically conductive taps. Additionally, each of the heater segments may be independently and individually controllable through the electrically conductive taps in electrical communication with that heater segment.

Also, the substrate of the microfluidic device may further include one or more channels formed therein that each operate as a thermal break for the thermal gradient produced by the one or more heaters. The fluidic channel may traverse the thermal gradient formed by the one or more heaters. The one or more thermal breaks may produce multiple thermal zones on the microfluidic device, and the fluidic channel of the substrate may traverse a portion of each of the multiple thermal zones. In addition, the fluidic channel of the substrate may have a spiral shape in one of the multiple thermal zones that transitions to a serpentine shape in another of the multiple thermal zones. A pitch of the fluidic channel of the substrate may vary within one or more of the multiple thermal zones.

The microfluidic device may further comprise a cooling element in thermally conductive contact with a first region of the substrate to cool that first region and to shape the thermal gradient within a second region of the substrate bounded by the cooling element.

The microfluidic device may further comprise a temperature sensor made of thick film material integrated with the substrate of the microfluidic device and in thermal communication with the one or more heaters, or one or more of a resistor, conductor, inductor, or dielectric made of thick film material integrated with the substrate.

In addition, the one or more heaters may include first and second spatially separated heaters, the first heater being disposed above the second heater. Each heater is independently operable to contribute to a shape of the thermal gradient within the fluidic channel. Also, the thick film material of one or more heaters may be ferromagnetic.

In another aspect, the invention features a separation system comprising a microfluidic device having a substrate with a fluidic channel. The microfluidic device further includes one or more heaters made of a thick film material integrated with the substrate and in thermal communication with the fluidic channel of the substrate. The separation system further comprises an electrical supply operatively coupled to the one or more heaters to cause a current to flow through the one or more heaters such that the one or more heaters produce a thermal gradient within the fluidic channel.

Embodiments of the separation system may include one of the following features, or any combination thereof.

The one or more heaters made of a thick film material may be formed within or on the substrate. At least one heater of the one or more heaters may be trapezoidal in shape with a narrow end and a wide end, wherein the trapezoidal shape of the at least one heater produces a warm-to-cool thermal gradient from the narrow end to the wide end. At least one heater of the one or more heaters may be comprised of a plurality of spatially separated heater segments connected in series by a plurality of electrically conductive taps that provide an electrically conductive path to the one or more heaters by which the electrical supply can cause the current to flow through the one or more heaters. Each heater segment is electrically connected to one or more of the electrically conductive taps. Each of the heater segments may be independently and individually controllable through the electrically conductive taps in electrical communication with that heater segment.

In addition, the substrate of the microfluidic device of the separation system may further include one or more channels formed therein that each operate as a thermal break for the thermal gradient produced by the one or more heaters. The fluidic channel may traverse the thermal gradient formed by the one or more heaters. The one or more thermal breaks may produce multiple thermal zones on the microfluidic device, and the fluidic channel of the substrate may traverse a portion of each of the multiple thermal zones. In addition, the fluidic channel of the substrate may have a spiral shape in one of the multiple thermal zones that transitions to a serpentine shape in another of the multiple thermal zones. A pitch of the fluidic channel of the substrate may vary within one or more of the multiple thermal zones.

The separation system may further comprise a cooling element in thermally conductive contact with a first region of the substrate of the microfluidic device to cool that first region and to shape the thermal gradient within a second region of the substrate bounded by the cooling element. The separation system may further comprise a temperature sensor made of thick film material integrated with the substrate of the microfluidic device and in thermal communication with the one or more heaters.

The microfluidic device of the separation system may further comprise one or more of a resistor, conductor, inductor, or dielectric made of thick film material integrated with the substrate. Also, the one or more heaters may include first and second spatially separated heaters, the first heater being disposed above the second heater. Each heater is independently operable to contribute to a shape of the thermal gradient within the fluidic channel. The thick film material may ferromagnetic, and the electrical supply may uses induction to cause the current to flow through the one or more heaters.

In another aspect, the invention features a method of fabricating a microfluidic device with an integrated thermal system. The method comprises producing a multilayer substrate. One or more of the layers of the substrate having a fluidic channel formed therein. One or more heaters made of a thick film material are screen-printed on one or more of the layers of the substrate. The one or more heaters are disposed in thermal communication with the fluidic channel to produce a thermal gradient within the fluidic channel when the one or more heaters are operated. The multilayer substrate is laminated, and the laminated multilayer substrate is sintered to produce a hardened monolithic microfluidic device.

Embodiments of the method may include one of the following features, or any combination thereof.

The one or more heaters may be disposed on an exterior surface of the substrate, wherein the screen-printing of the one or more heaters occurs after the sintering. Also, the one or more heaters may be disposed on an exterior surface of the substrate, wherein the screen-printing occurs before the sintering. In addition, the one or more heaters may be disposed within the substrate on an interior surface of the substrate, wherein the screen-printing of the one or more heaters occurs before the sintering.

The method may further comprise forming a plurality of electrically conductive taps that are in electrical communication with the one or more heaters.

In addition, the screen-printing of one or more heaters may include screen-printing first and second spatially separated heaters, each heater being independently operable to contribute to a shape of the thermal gradient within the fluidic channel. Further, a temperature sensor made of thick film material may be screen-printed on one of the layers of the substrate and in thermal communication with the one or more heaters. Also, the thick film material of the one or more heaters may be ferromagnetic.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The techniques described herein relate to the use of thick films to produce electronic elements, such as conductors, resistive heaters, heat spreaders, and sensors, on a microfluidic device by which to produce, shape, and control a thermal gradient on the microfluidic device. Direct application of shaped thick film heaters on the surface or embedded in the substrate of the microfluidic device adds design flexibility and control of the thermal gradient profile. An advantage achieved by the thick films is the ability to trim or shape a heater to linearize the thermal region. Shaping the resistive element (i.e., heater) can be an effective technique for thermal control. A trapezoid heater, for example, has a higher current density, and thus is warmer, at its narrow end than at its wide end.

Figure 2A:
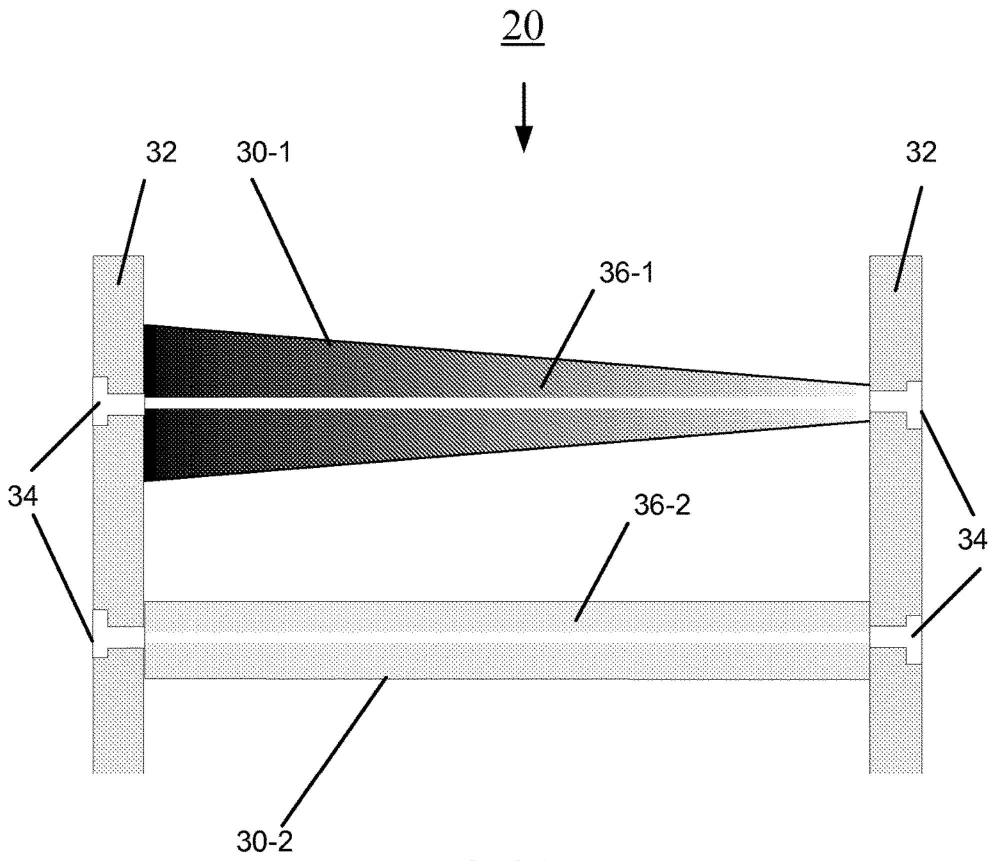
FIG. 2A is a diagram of two heaters (a trapezoidal heater and a rectangular heater) connected in parallel.
Figure 2B:
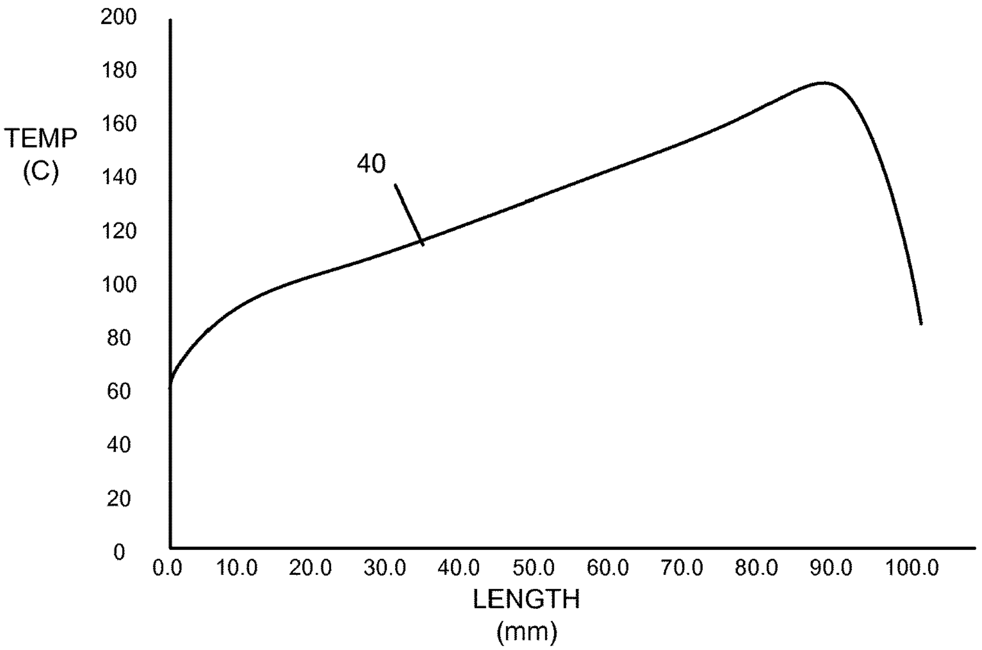
FIG. 2B is an example of a temperature plot associated with the trapezoidal heater of FIG. 2A.
Figure 2C:
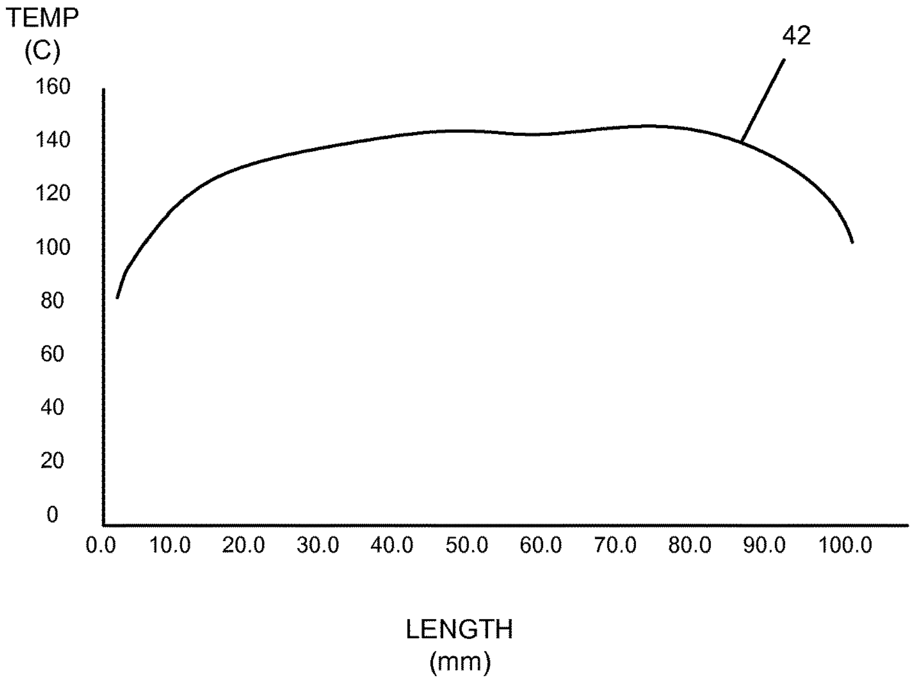
FIG. 2C is an example of a temperature plot associated with the rectangular heater of FIG. 2A.

In addition to establishing a thermal gradient, thick films can also operate to trim temperature spikes and droops (see, for example, temperature plots in FIG. 2B and FIG. 2C). Further, cooling, thermal breaks in the substrate of the microfluidic device, or a combination thereof, can shape the thermal gradient and mitigate conduction beyond a desired thermal region. Thermal breaks can also prove effective in producing a thermal gradient because of the surface area and volume differences from one end of the microfluidic device to its other end. A larger volume and surface area increases the thermal load of the microfluidic device, in turn, lowering the temperature.

In addition, thick films are capable of high temperatures and heating rates needed for gas chromatography (GC), liquid chromatography (LC), supercritical fluid chromatography (SFC), capillary electrophoresis (CE), and other forms of separations.

Figure 1A:
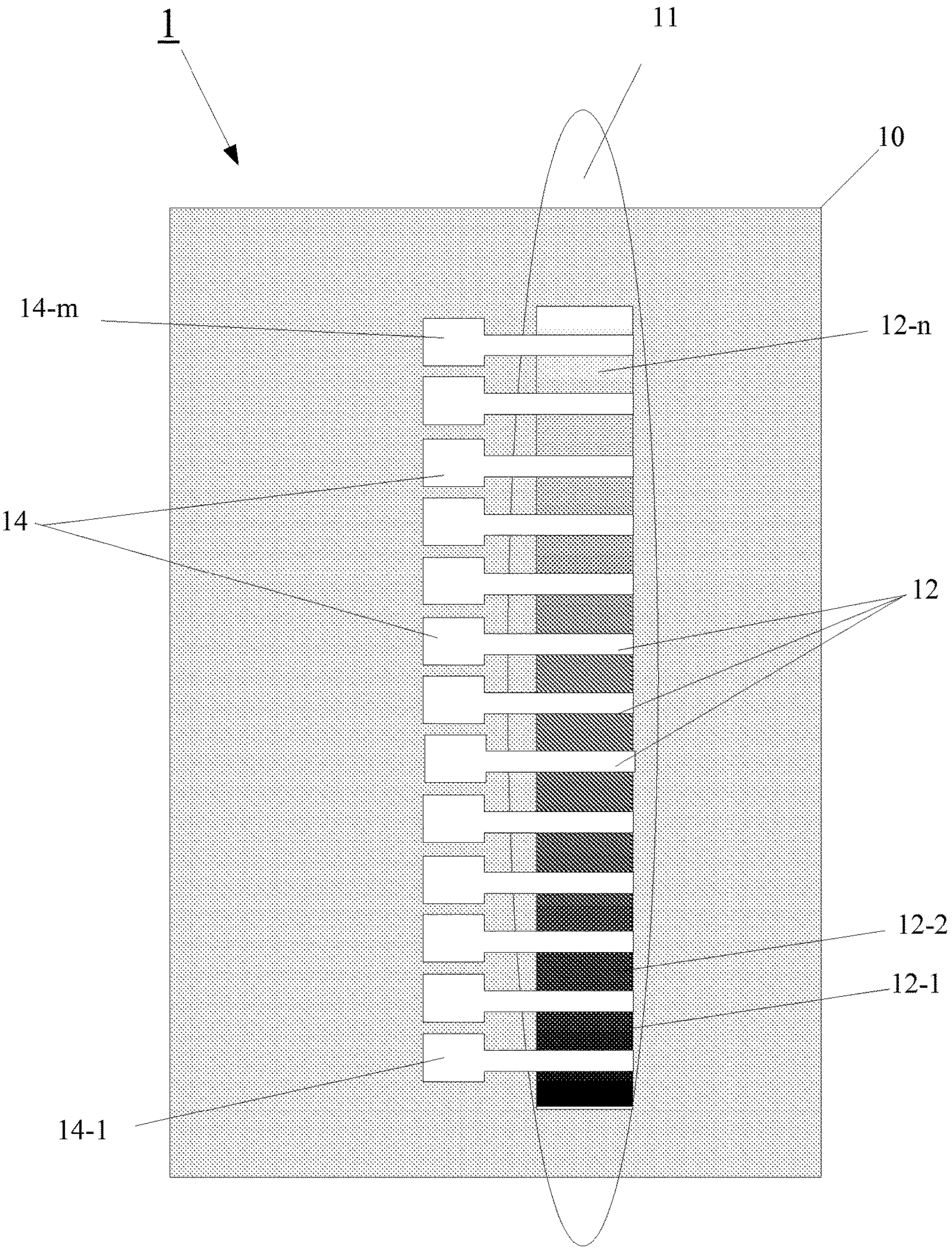
FIG. 1A is a diagram of an embodiment of a thermal system for producing a thermal gradient near a fluidic channel (e.g., a chromatography column) in a microfluidic device using one or more thick film heaters.
Figure 1B:
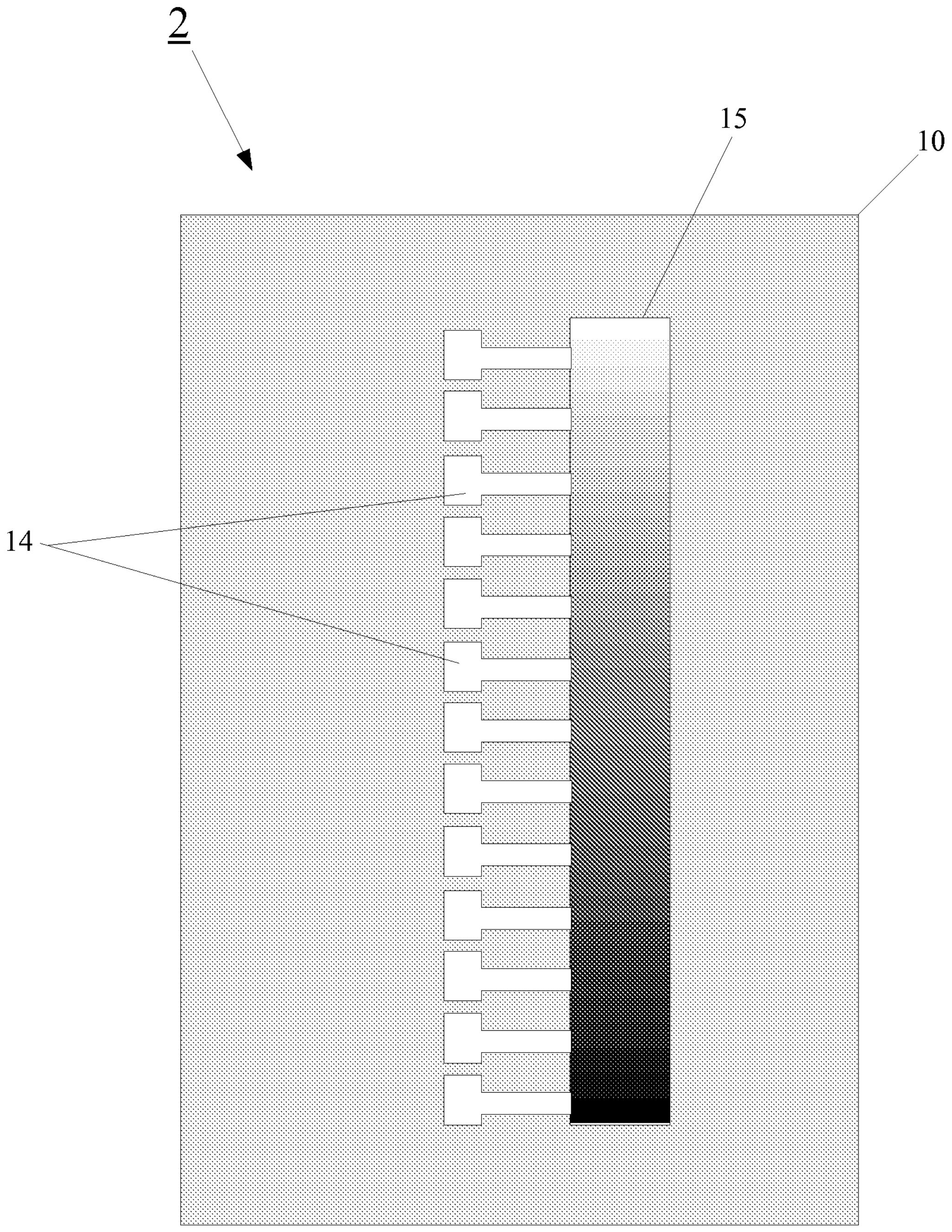
FIG. 1B is a diagram of an embodiment of a thermal system for producing a thermal gradient near a fluidic channel in a microfluidic device.
Figure 1C:
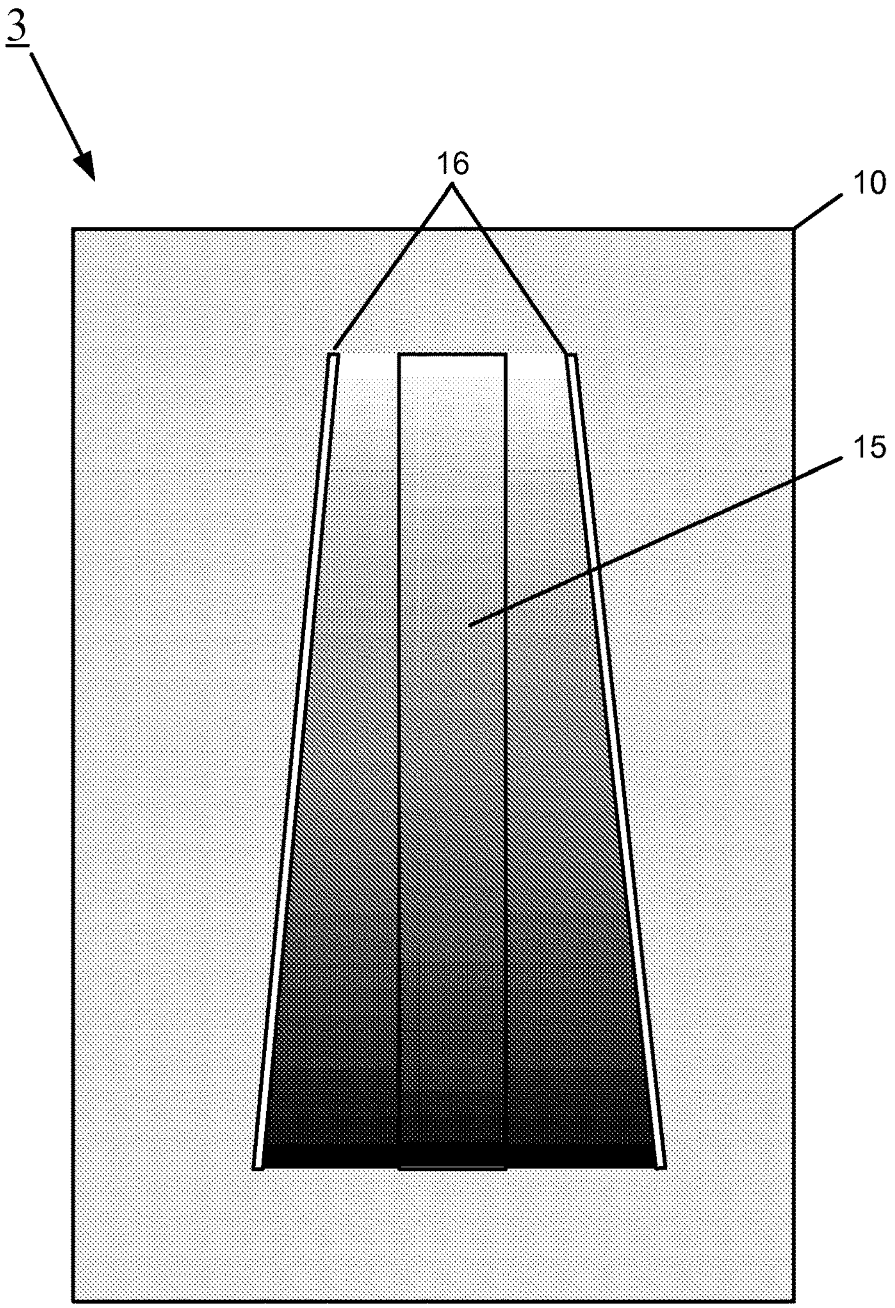
FIG. 1C is a diagram of an embodiment of a thermal system for producing a thermal gradient near a fluidic channel in a microfluidic device.
Figure 1D:
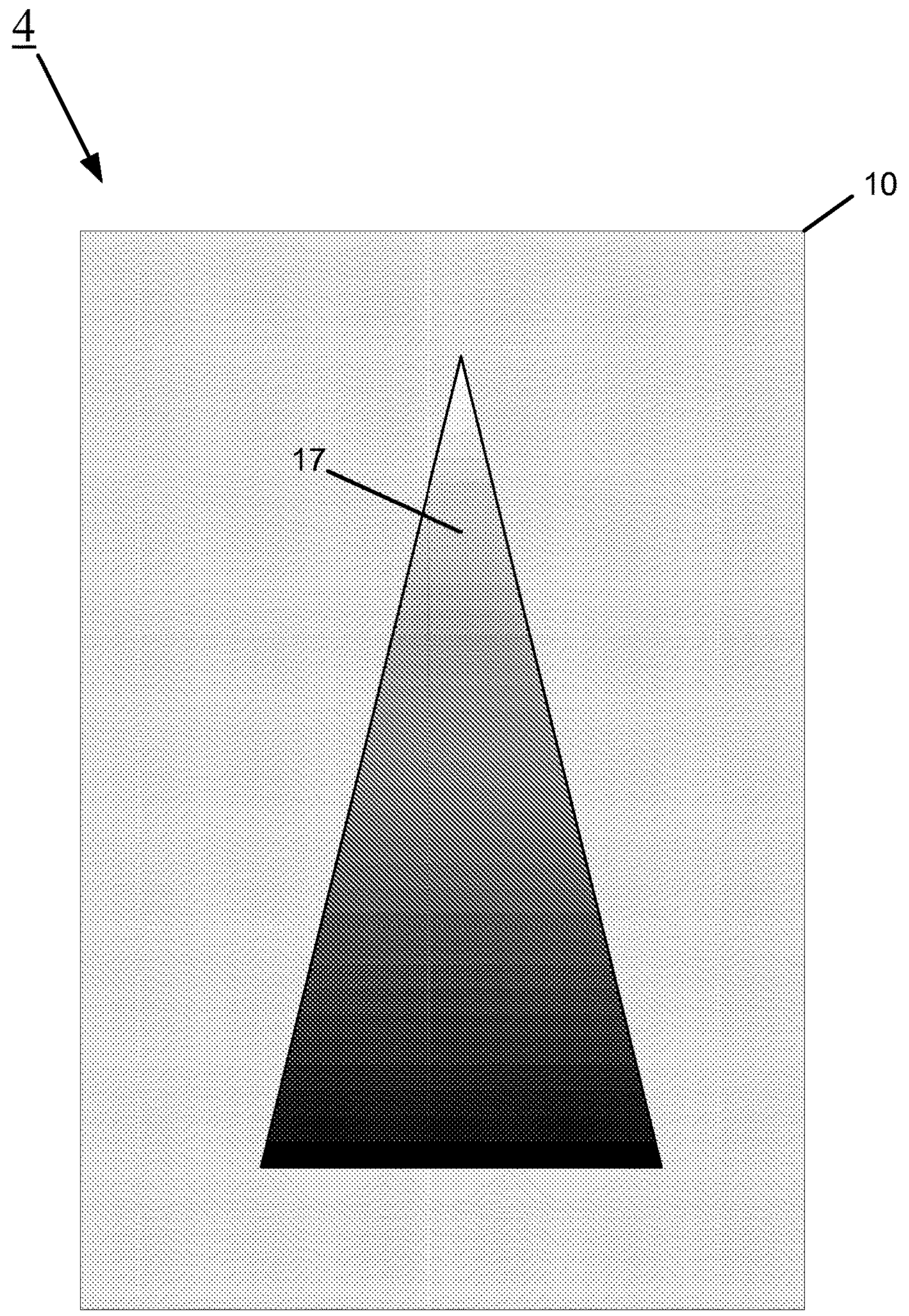
FIG. 1D is a diagram of an embodiment of a thermal system for producing a thermal gradient near a fluidic channel in a microfluidic device.
Figure 1E:
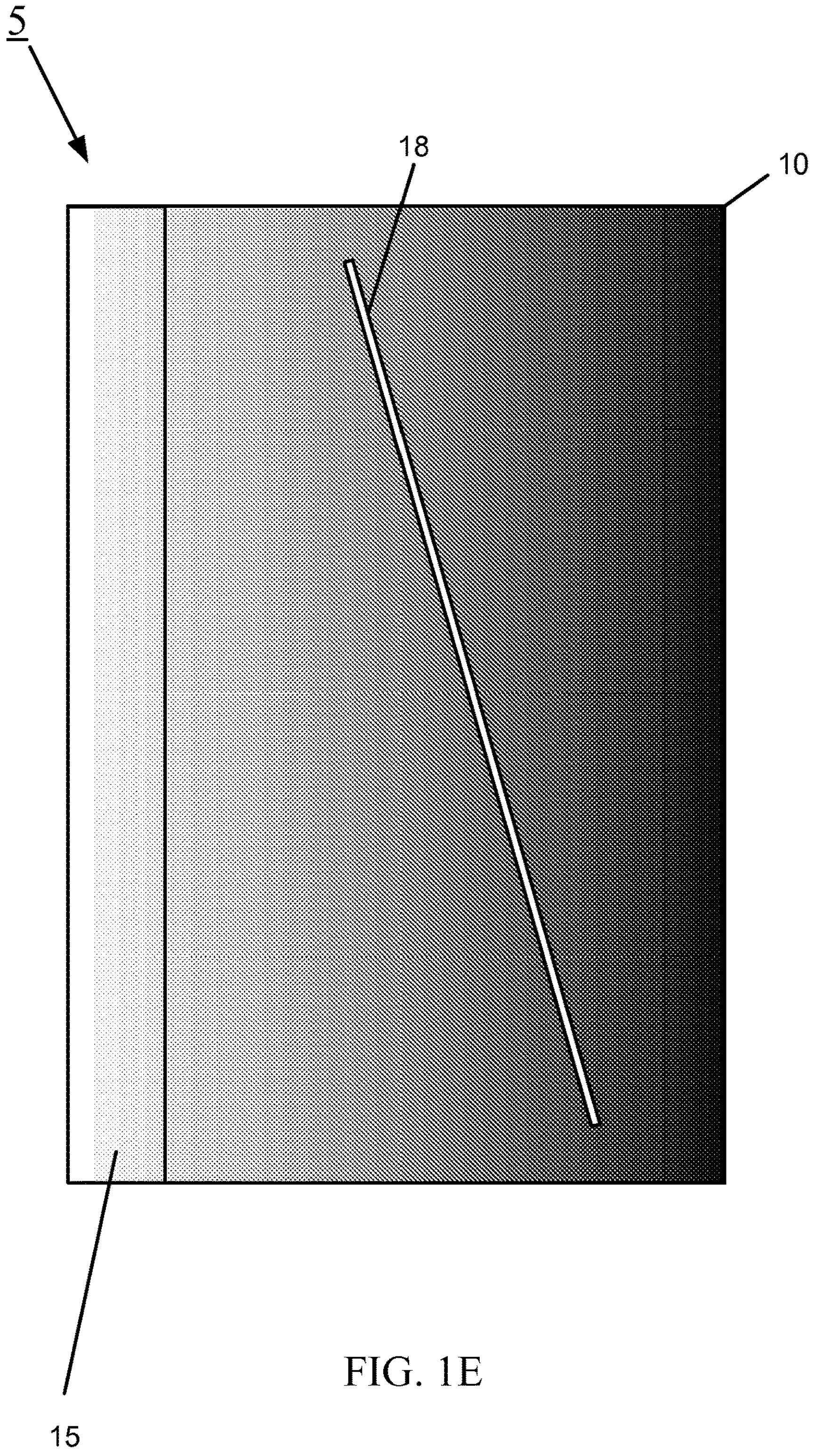
FIG. 1E is a diagram of an embodiment of a thermal system for producing a thermal gradient near a fluidic channel in a microfluidic device.
Figure 1F:
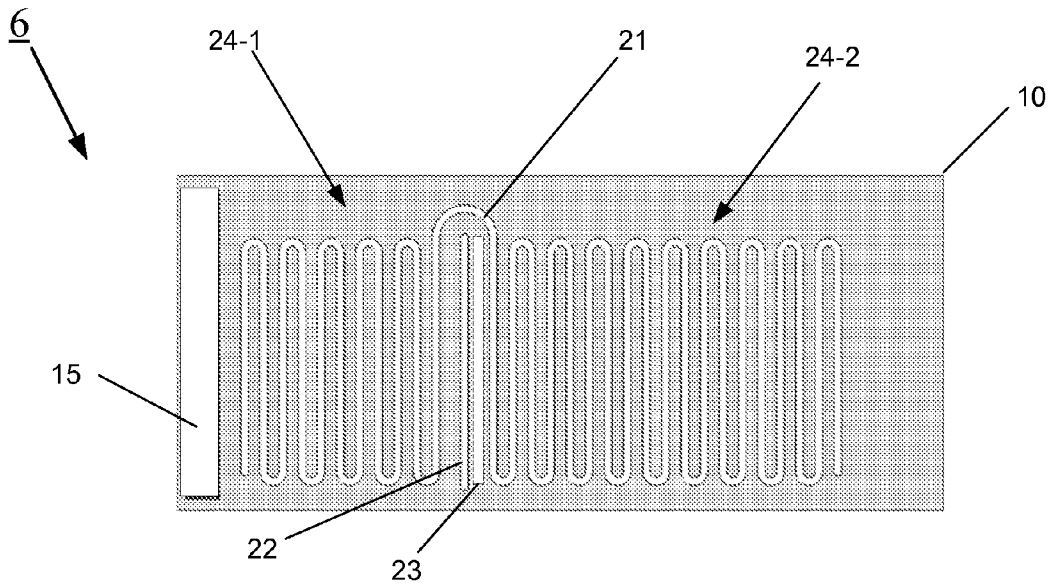
FIG. 1F is a diagram of an embodiment of a multi-zone thermal system for producing a thermal gradient near a fluidic channel in a microfluidic device.
Figure 1G:
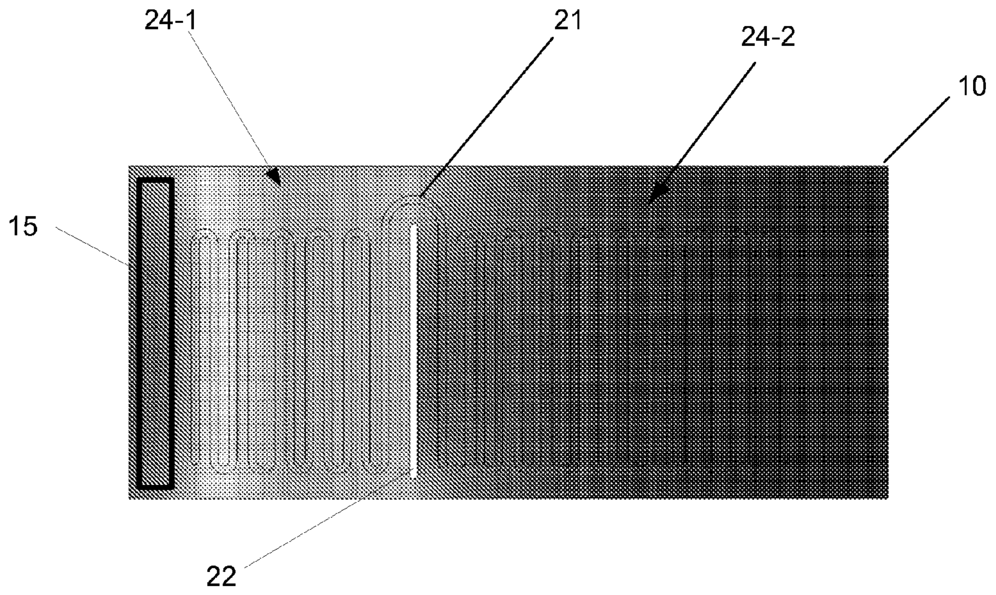
FIG. 1G is a diagram of the embodiment of thermal system of FIG. 1E in operation, producing a thermal gradient in one zone traversed by a channel and thermal uniformity in a second zone traversed by the channel.
Figure 1H:
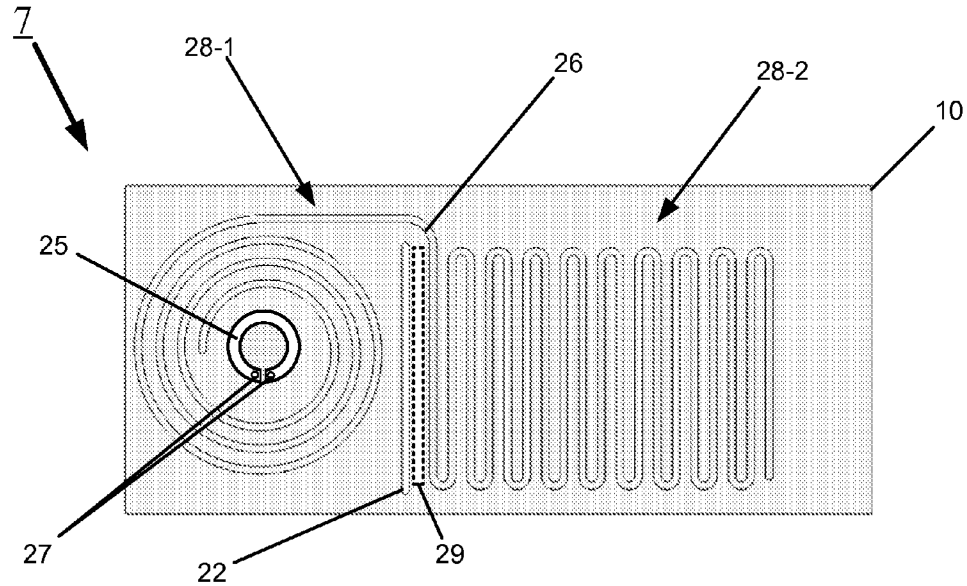
FIG. 1H is a diagram of an embodiment of a multi-zone thermal system for producing a thermal gradient near a fluidic channel in a microfluidic device.
Figure 1I:
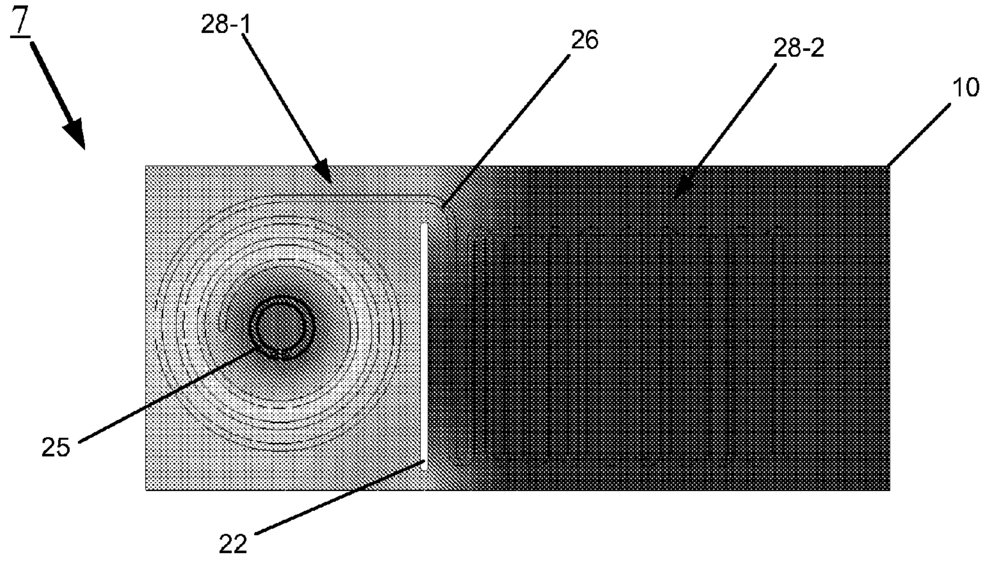
FIG. 1I is a diagram of the embodiment of thermal system of FIG. 1H in operation, producing a radial thermal gradient in one zone traversed by a channel and thermal uniformity in a second zone traversed by the channel.

FIGS. 1A-1I show embodiments of thermal systems 1, 2, 3, 4, 5, 6, and 7 for producing a thermal gradient near a fluidic channel (e.g., a chromatography column) in a microfluidic device 10 using one or more thick film heaters. In brief overview, each thick film heater is formed on an interior or exterior layer of the microfluidic device, where that thick film heater is in thermal communication with the fluidic channel of the microfluidic device. Operation of the one or more thick film heaters produces a thermal gradient within the fluidic channel. FIGS. 1A-1E represent a thermal gradient as gradual color transition from darkly colored regions, representing cool temperatures, to lightly colored regions, representing warmer temperatures; FIG. 1G and FIG. 1I represent a thermal gradient as gradual color transition from a red region representing hot temperatures, to yellow and green regions, representing warm temperatures, to darkly colored blue regions, representing cool temperatures. This thermal gradient can be static or dynamically controlled to traverse the fluidic channel. In addition to traversing the channel, the thermal gradient may simply change in shape.

Low-Temperature Co-fired Ceramic (LTCC) or High-Temperature Co-fired ceramic (HTCC) tapes can be used manufacture the microfluidic substrate on which the one or more thick film heaters are applied. Examples of LTCC tapes include the 951 Green Tape™ ceramic tape produced by DuPont Microcircuit Materials of Research Triangle Park, N.C., and LTCC ceramic tapes produced by ESL Electro Science of King of Prussia, Pa. LTCC technology enables low-temperature (about 850° C.) co-firing of the thick film heater and substrate layers of the multilayer microfluidic device. These microfluidic devices can be made, for example, of ceramic, silicon, silica, polymers, polyimide, stainless steel, or titanium. Examples of multilayer microfluidic devices are described in U.S. patent application Ser. No. 13/321,696, titled "Chromatography Apparatus and Methods Using Multiple Microfluidic Substrates", the entirety of which is incorporated by reference herein. Although not shown, embodiments of thermal system can include a cooling element, such as a heat sink, fans, fluidic cooling, or a Peltier device, to reduce quickly the temperature of the microfluidic device whenever desired.

FIG. 1A shows an embodiment of thermal system 1 including a microfluidic device 10 with a segmented thick film heater 11 comprised of a plurality of spatially separated discrete thick film heaters 12 (or heater segments 12) disposed in thermal communication with a fluidic channel (not shown) within the microfluidic device 10. The thermal system 1 further includes a plurality of electrically conductive taps 14 by which a voltage can be individually supplied to, or a current individually driven through, the discrete heaters 12. The electrically conductive taps 14 can be made, for example, of a silver-palladium paste. Each discrete heater extends between two of the conductive taps 14. The discrete heaters 12 can be made of a resistive paste (e.g., ESL 33000 series resistor paste produced by ESL Electro Science of King of Prussia, Pa.). The heater segments 12 and taps 14 provide a continuous electrical path from the first electrical tap 14-1 to the last electrical contact 14-*m*. Individual control of the heaters 12 facilitates the generation of a thermal gradient along a length of the segmented heater 11.

The thermal gradient can be statically maintained to attain a particular temperature profile, or dynamically controlled to vary or move the thermal gradient as desired by individually controlling the voltage or current supplied through the electrically conductive taps 14. For example, consider that initially all heater segments 12 are turned off. Then consider that the heater segments 12 are turned on, one at a time in sequence, with the previously turned on heater segment being turned off; for instance, the first heater 12-1 segment turns on, while the others are off; then the first heater segment 12-1 turns off while the second heater segment 12-2 turns on, and likewise so on, down the length of the heater 11 to the last heater segment 12-*n*. Hence, by dynamically turning individual heater segments 12 on and off at precise moments, the warm region of the thermal gradient marches along the full length of the segmented heater 11. In addition, the march of the warm region along the segmented heater 11 can be synchronized or coordinated with the flow of fluid through a fluidic channel within the microfluidic device 10. This is but one example how individual control of heater segments 12 can manipulate the shape and placement of a thermal gradient.

FIG. 1B shows an embodiment of thermal system 2, including a microfluidic device 10 having a continuous (i.e., non-segmented) thick film heater 15 with multiple electrically conductive taps 14. To show that the heater 15 is continuous the taps 14 appear to terminate at the edge of the heater 15; in actuality, they extend behind (underneath) the heater 15, where they make electrical contact with the heater 15. In a similar fashion as the thermal system 1 of FIG. 1, individual control of the taps 14 can produce a static or dynamically varying thermal gradient near a fluidic channel (not shown) within the microfluidic device 10.

FIG. 1C shows an embodiment of thermal system 3, including a microfluidic device 10 with a continuous thick film heater 15 bounded on two sides by spatially separated grooves or channels 16 cut into the surface of the substrate of the microfluidic device 10. The channels 16 operate to provide a thermal break that restricts the transfer of heat, and thus the thermal gradient, to the thermal region between the channels 16. In this embodiment of thermal system 3, the channels 16 converge; one end of the thermal region between the channels 16 is narrower than the other, opposite end of the thermal region. The narrowing of the thermal region between the channels 16 produces a thermal gradient from cooler (darker) temperatures at the wider end to warmer (light) temperatures at the narrower end. Although not shown, this embodiment of thermal system 3 includes two or more electrically conductive taps in electrical communication with the heater 15 to send a current through or apply a voltage across the heater 15.

FIG. 1D shows an embodiment of thermal system 4, including a microfluidic device 10 with a trapezoidal-shaped thick film heater 17. Not shown are electrically conductive taps; in one embodiment, there is one tap at each end of the heater 17 for causing a current to flow through the heater, producing heat by resistive heating; in another embodiment the taps partition the heater 17 into multiple heater segments. Alternatively, a current can be induced to flow through a heater made of ferromagnetic material (e.g., iron, nickel, cobalt, etc.).

Because the current density is greater at the narrow end of the trapezoid than at the wide end, the current flow through the heater 17 produces a thermal gradient from cooler (dark) temperatures at the wide end to warmer (light) temperatures at the narrow end. Other thick film heater shapes can be formed to produce a desired thermal gradient.

FIG. 1E shows an embodiment of thermal system 5, including a microfluidic device 10 and a rectangular continuous thick film heater 15 in thermal contact with the substrate of the microfluidic device 10. The rectangular continuous heater 15 is disposed at one side of the microfluidic device 10. Conduction of the heat produced by the heater 15 produces a natural thermal gradient, transitioning from warmer (lighter) temperatures at and near the heater 15 to cooler (dark) temperatures as the distance from the heater 15 increases. The microfluidic device 10 includes a chromatography column 18 formed therein, on the same or a different layer of the microfluidic device 10 from the heater 15. The column 18 and rectangular heater 15 are converging; one end of the column 18 is closer to the rectangular heater 15 than the other end of the column 18. Accordingly, the column 18 traverses the natural thermal gradient produced by the heater 15; the end of the column 18 closer to the rectangular heater 15 experiencing warmer temperatures than the end of the column 18 more distant from the heater 15. Consequently, a mobile phase traveling through the column 18 is exposed to this thermal gradient.

FIG. 1F shows an embodiment of a multi-zone thermal system 6, including a microfluidic device 10 and a rectangular continuous thick film heater 15 in thermal contact with the substrate of the microfluidic device 10. The rectangular continuous heater 15 is disposed at one side of the microfluidic device 10. The microfluidic device 10 includes a serpentine chromatography column 21 formed therein, on the same or a different layer of the microfluidic device 10 from the heater 15. One end of the serpentine chromatography column 20 is near the heater 15; the opposite end of the column 21 approaches the opposite end of the microfluidic device 10.

A thermal break 22 is formed in the substrate of the microfluidic device 10. In this example, the thermal break 22 is disposed within the eleventh bend of the serpentine chromatography column 21. The placement of the thermal break 22 operates to partition the thermal system 6 into two thermal zones 24-1 and 24-2. It is to be understood that the particular location of the thermal break 22 is only one example, used to illustrate a technique for producing multiple thermal zones. In addition, one or more thermal breaks of the same, similar, or different shapes and sizes may be deployed in conjunction with one or more thick film heaters to produce a thermal system with more than two thermal zones. Not shown are electrically conductive taps; in one embodiment, there is one tap at each end of the heater 15 for causing a current to flow through the heater, producing heat by resistive heating; in another embodiment the taps partition the heater 15 into multiple heater segments.

FIG. 1G shows an example of a thermal gradient produced by the embodiment of thermal system 6 of FIG. 1E when the heater 15 is activated. Conduction of the heat produced by the heater 15 produces a natural thermal gradient in the thermal zone 24-1, transitioning from warmer (red) temperatures at and near the heater 15 to cooler (yellow and green) temperatures as the distance from the heater 15 increases. The thermal break 22 interrupts this thermal gradient and produces a thermally uniform zone 24-2 (blue) on the side of the thermal break 22 opposite the heater 15. The chromatography column 21 traverses both the natural thermal gradient in the first zone 24-1 and the thermal uniformity in the second zone 24-2.

A secondary heater 23, shown in phantom, can be employed in the second thermal zone 24-2, disposed adjacent and parallel to the thermal break 22. Any of the aforementioned embodiments of rectangular thick film heaters (i.e., segmented, continuous) can be used to implement this secondary heater 23. Other placement locations for the rectangular thick-film heater 23 can be at the other end of the microfluidic device 10 opposite the thermal break 22, lengthwise (perpendicular to the thermal break 22) along the top or bottom of the microfluidic device 10, lengthwise (perpendicular or angled with respect to the thermal break 22) in a layer above or below the serpentine portion of the column 21, or any combination of such aforementioned locations, depending upon the particular desired thermal gradient, if any, within the second thermal zone 24-2.

FIG. 1H shows another embodiment of a multi-zone thermal system 7 including a microfluidic device 10 and a thick film heater 25 in thermal contact with the substrate of the microfluidic device 10. The heater 25 has the shape of a ring and is disposed at one end of the microfluidic device 10. Electrical contacts 27 provide connections for causing a current to flow through the heater 25. The microfluidic device 10 includes a chromatography column 26 formed therein, on the same or a different layer of the microfluidic device 10 from the heater 25. One section of the column 26 has a spiral shape; the spiral shape of the column 26 transitions into a serpentine shape.

A thermal break 22 is formed in the substrate of the microfluidic device 10 where the spiral shape transitions to the serpentine shape. The thermal break 22 operates to partition the thermal system 6 into two thermal zones 28-1 and 28-2. It is to be understood that one or more thermal breaks of the same, similar, or different shapes and sizes may be deployed in conjunction with one or more thick film heaters to produce a thermal system with more than two thermal zones. The spacing, or pitch, of the column 26 may or may not be constant in either or both of the zones 28-1, 28-2. For example, the pitch (or spacing between neighboring curves of the spiral) of the column 26 may vary as the column 26 traverses the spiral zone 28-1. Varying the pitch of the column 26 in the spiral zone 28-1 and or the spacing in the serpentine zone 28-2 can serve to linearize the spacial gradient in the column 26 if the thermal gradient is non-linear. Not shown are electrically conductive taps; in one embodiment, there is one tap at each end of the heater 25 for causing a current to flow through the heater, producing heat by resistive heating; in another embodiment the taps partition the ring-shaped heater 25 into multiple heater segments.

FIG. 1I shows an example of a thermal gradient produced by the embodiment of thermal system 7 of FIG. 1E when the heater 15 is activated. Conduction of the heat produced by the heater 25 produces a radial thermal gradient in the thermal zone 28-1, transitioning from warmer (red) temperatures at and near the heater 25 to cooler (yellow and green) temperatures as the distance from the heater 25 increases. The thermal break 22 interrupts this thermal gradient and produces a thermally uniform zone 28-2 (blue) on the side of the thermal break 22 opposite the heater 25. The chromatography column 26 traverses both the radial thermal gradient in the first zone 28-1 and the thermal uniformity in the second zone 28-2.

The multi-zone thermal system 7 of FIG. 1H and FIG. 1I is just one illustrative example. Other examples include, but are not limited to, a serpentine column in the first thermal zone 28-1 transitioning to a spiral in the second thermal zone 28-2; and a spiral column in the first thermal zone 28-1 transitioning to a second spiral in the second thermal zone 28-1.

Further, a secondary heater can be employed in the second thermal zone 28-2 to enhance thermal uniformity or produce a thermal gradient, if desired, within the second thermal zone. For example, a rectangular thick-film heater may be used for when the column 26 is serpentine within the second thermal zone 28-2, or a donut-shaped thick-film heater, similar to the heater 25, may be used for when the column 26 has a spiral shape within the second thermal zone 28-2.

In the instance of a serpentine-shaped column in the second thermal zone 28-2, a rectangular thick-film heater 29, shown in phantom, may be disposed adjacent and parallel to the thermal break 22 within the second thermal zone 28-2. Any of the aforementioned embodiments of rectangular thick film heaters (i.e., segmented, continuous) can be used to implement this secondary heater 29. Other placement locations for the rectangular thick-film heater 29 can be at the other end of the serpentine column 26 opposite the thermal break 22, lengthwise (perpendicular to the thermal break 22) along the top or bottom of the microfluidic device 10, lengthwise (perpendicular or angled with respect to the thermal break 22) in a layer above or below the serpentine portion of the column 26, or any combination of such aforementioned locations, depending upon the particular desired thermal gradient within the second thermal zone 28-2.

FIG. 2A shows an embodiment of a heater stack 20 comprised of two heaters, a trapezoidal heater 30-1 and a rectangular heater 30-2. The heaters 30-1, 30-2 are connected in parallel to electrical conduits 32 by electrically conductive taps 34, one tap 34 on each end of each heater. Two layers of resistor paste produce the heater stack 20; one layer for the trapezoidal-shaped heater 30-1 is screened on top of the other layer that provides the rectangular heater 30-2. The trapezoidal heater 30-1, when operating, produces a thermal gradient 36-1 that becomes increasing warmer (lighter) as the width of the heater. The rectangular heater 30-2, when operating, produces a generally uniform thermal gradient 36-2. The heater stack 20 can be formed on or within a substrate of a microfluidic device, where the combined effect of the heaters 30-1, 30-2 is in thermal communication with a fluidic channel. The combined effect can also operate to smooth out temperature spikes and droops.

Although shown connected in parallel for joint activation (i.e., either both are on or both are off), the heaters 30-1, 30-2 can alternatively be connected to be independently operable. Multiple independently operable heaters facilitate dynamic control of the thermal gradient within a fluidic channel. One heater 30-1 can serve as a primary heater, and another heater 30-2 as a supplemental heater. Consider, for example, that two stacked heaters 30-1, 30-2 are configured to produce thermal gradients in opposite directions; that is, the primary heater produces a warm-to-cool gradient in a reverse direction than the thermal gradient produced by the supplemental heater. Further consider that the primary heater is activated, while the supplemental heater is off. To neutralize quickly the thermal gradient produced by the primary heater, the primary heater can be turned off and the supplemental heater turned on. After neutralization, the thermal gradient can then be made to reverse.

FIG. 2B shows a thermal profile 40 for the trapezoidal-shaped heater 30-1 and FIG. 2C shows a thermal profile 42 for the rectangular heater 30-2. In each temperature profile 40, 42, the x-axis corresponds to a position along the length of the heater (position 0 mm corresponding to the left end of the given heater—as shown in FIG. 2A); the y-axis is the temperature produced by the given heater. Each thermal profile 40, 42 corresponds to the thermal gradient that can be produced by the heaters 30-1, 30-2, respectively.

The temperature profile 40 indicates that the thermal gradient 36-1 produced by the trapezoidal heater 30-1 ranges from about 60° C. at the wide end of the heater to a peak temperature of about 180° C. near its narrow end. The drop off in temperature at the narrow end of the heater 30-1 may be attributable to the cooling effect of the conductive tap 34.

The temperature profile 42 indicates that the thermal gradient 36-2 produced by the rectangular heater 30-2 ranges from about 60° C. at the left end of the heater to a peak temperature of about 145° C. near its right end. For a majority of the length of the heater 30-2, the temperature produced is relatively constant; the temperatures are lowest where the heater 30-2 makes contact with the electrically conductive taps 34. It is to be understood that such terms like above, below, upper, lower, left, right, top, bottom, front, and rear are relative terms used for purposes of simplifying the description of features as shown in the figures, and are not used to impose any limitation on the structure or use of a thermal system or heater configuration.

Figure 3:
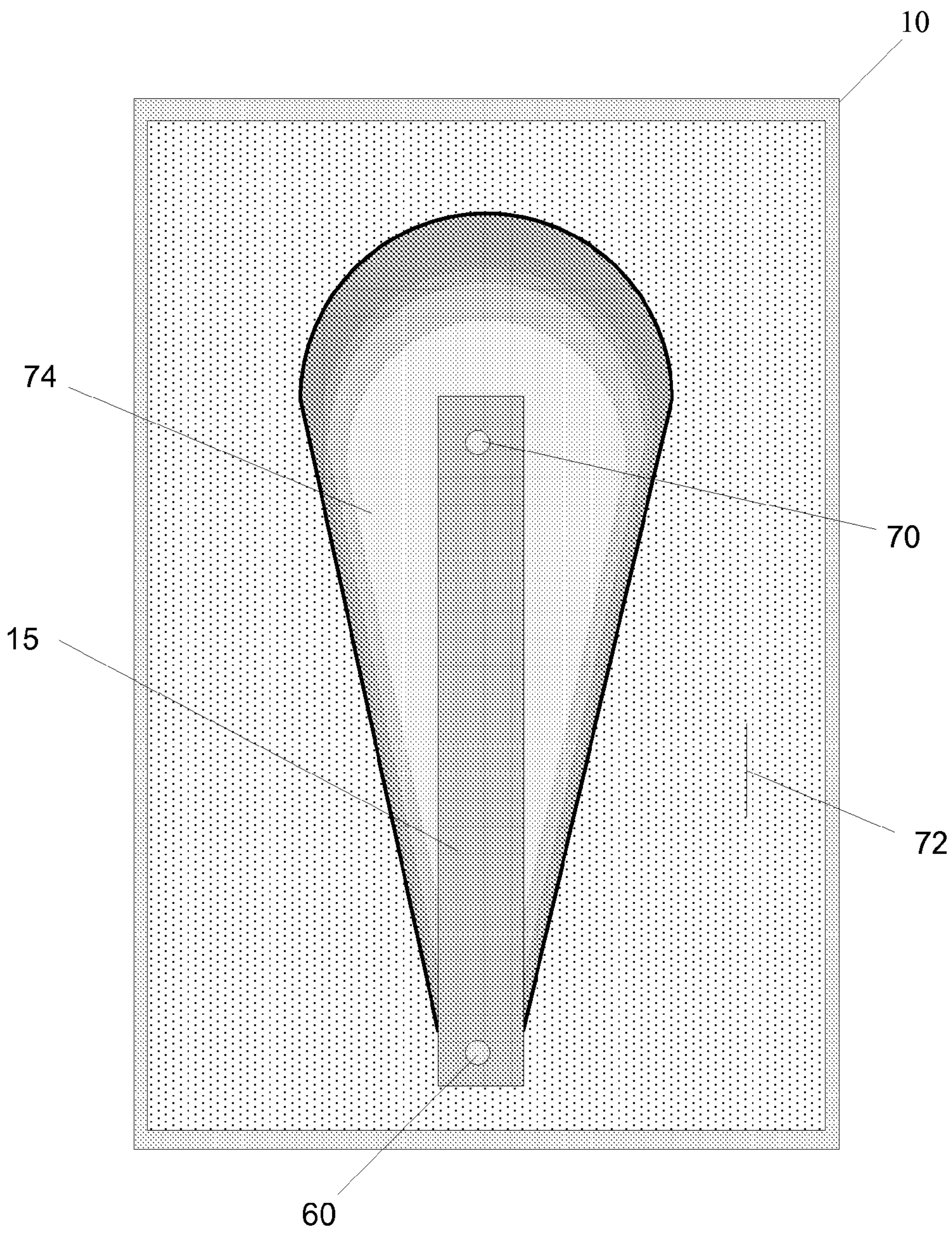
FIG. 3 is a diagram of an embodiment a technique for shaping a thermal gradient using a thick film heater and a shaped cooling mechanism.

FIG. 3 shows an embodiment of a technique for shaping a thermal gradient using a thick film heater and a shaped cooling mechanism. In this embodiment, the microfluidic device 10 has a fluidic channel formed in an intermediate layer of the device 10. The fluidic channel is not visible in FIG. 3; a uniform watt thick film heater 15 is disposed over the fluidic channel (on a different layer of the substrate from the channel). An inlet 60 and outlet 70 to the fluidic channel are shown at opposite ends of the heater 15. The inlet 60 and outlet 70 are through-holes or vias that extend through the layer of the thick film heater 15 to provide ports into and out of the fluidic channel, respectively.

Heat transfers laterally from the sides and from the ends of the heater 15; a thermal gradient 70 forms with the warmer (light colored) temperatures being adjacent the heater 15. A cooling element 72 (e.g., a passive cooling element such as a heat sink or an active cooling element such as a Peltier device) is in thermally conductive contact with a surface of the microfluidic device 10 surrounding the heater 15. The cooling element 72 can maintain the surrounding region at ambient temperature. A region of the surface of the microfluidic device 10 remains uncovered by the cooling element 72. The shape of the uncovered region shapes the thermal gradient 74. In this embodiment, the cooling element 72 surrounds a tapered (teardrop) shaped uncovered region. The surrounded region is cooler where it is near or abuts the cooling element 72, and warmer with greater lateral distances from the cooling element 72. The resulting teardrop-shaped thermal gradient 74 (warm to cool being represented by lighter colors transitioning to darker colors) is warm near the sides and top of the heater 15 and increasingly cooler as it progresses nearer to the cooling element 72.

Figure 4:
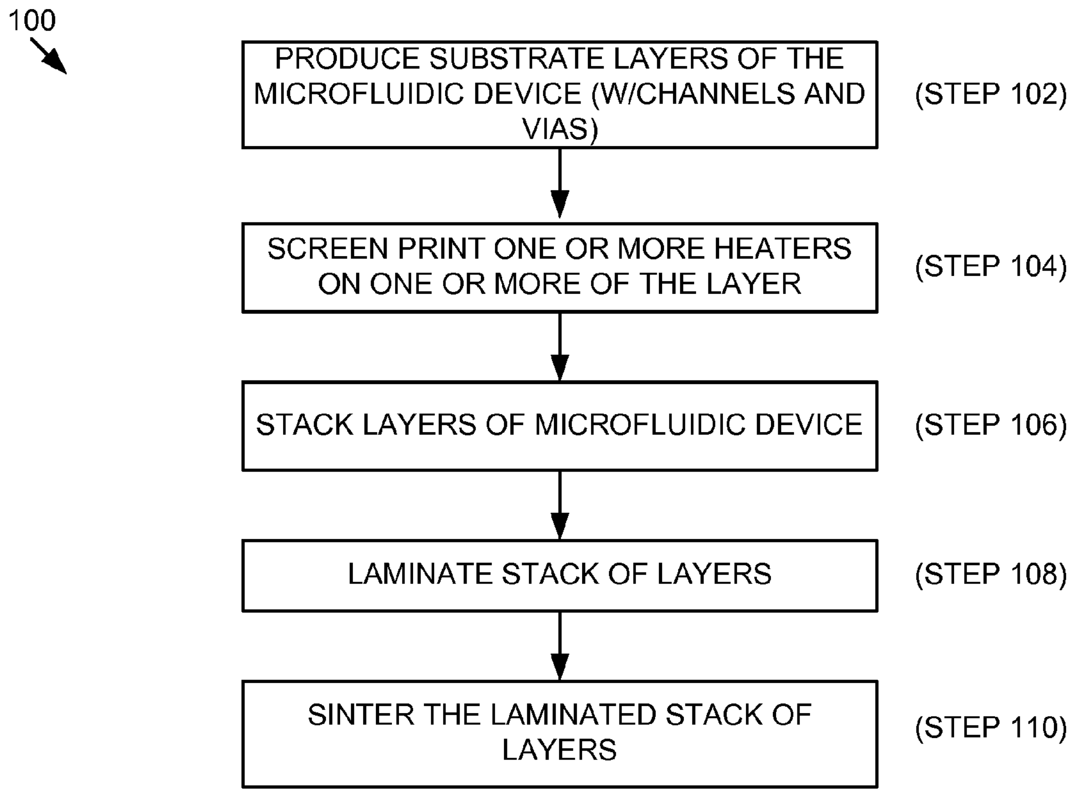
FIG. 4 is a flow diagram of an embodiment of a process for producing a microfluidic device with an integrated thermal system that produces a thermal gradient within a fluidic channel in the microfluidic device.

FIG. 4 shows an embodiment of a process 100 for producing a microfluidic device (e.g., ceramic or titanium) with an integrated thermal system that produces a thermal gradient within a fluidic channel of the microfluidic device. In step 102, the layers of the microfluidic device are cut. One or more of the layers has a fluidic channel for use as a chromatographic column; one or more other channels can be cut into one or more of the layers to operate as thermal breaks (e.g., channels 16 of FIG. 1C). Layers can have ports (vias) that enable electrical and/or fluidic communication between layers of the microfluidic device.

At step 104, one or more heaters of thick film material are screen printed on one or more layers of the microfluidic device. The one or more heaters can be screen printed on one or more exterior layers of the microfluidic device, one or more interior layers, or any combination thereof. Other electronic elements, for example, dielectrics, resistors, conductors, etc., can be screen-printed in addition to the heaters. In this embodiment of the process 100, the screen-printing occurs before the microfluidic device is sintered (step 110).

The layers are stacked (step 106) and the stack of layers is then laminated (step 108). The laminated stack of layers is sintered (step 110) in a furnace to harden the layers into a monolithic substrate of the microfluidic device. Accordingly, in this embodiment of the process 100, the one or more thick film heaters, and any other screen-printed electronic elements, are co-fired with the layers of the microfluidic device.

Figure 5:
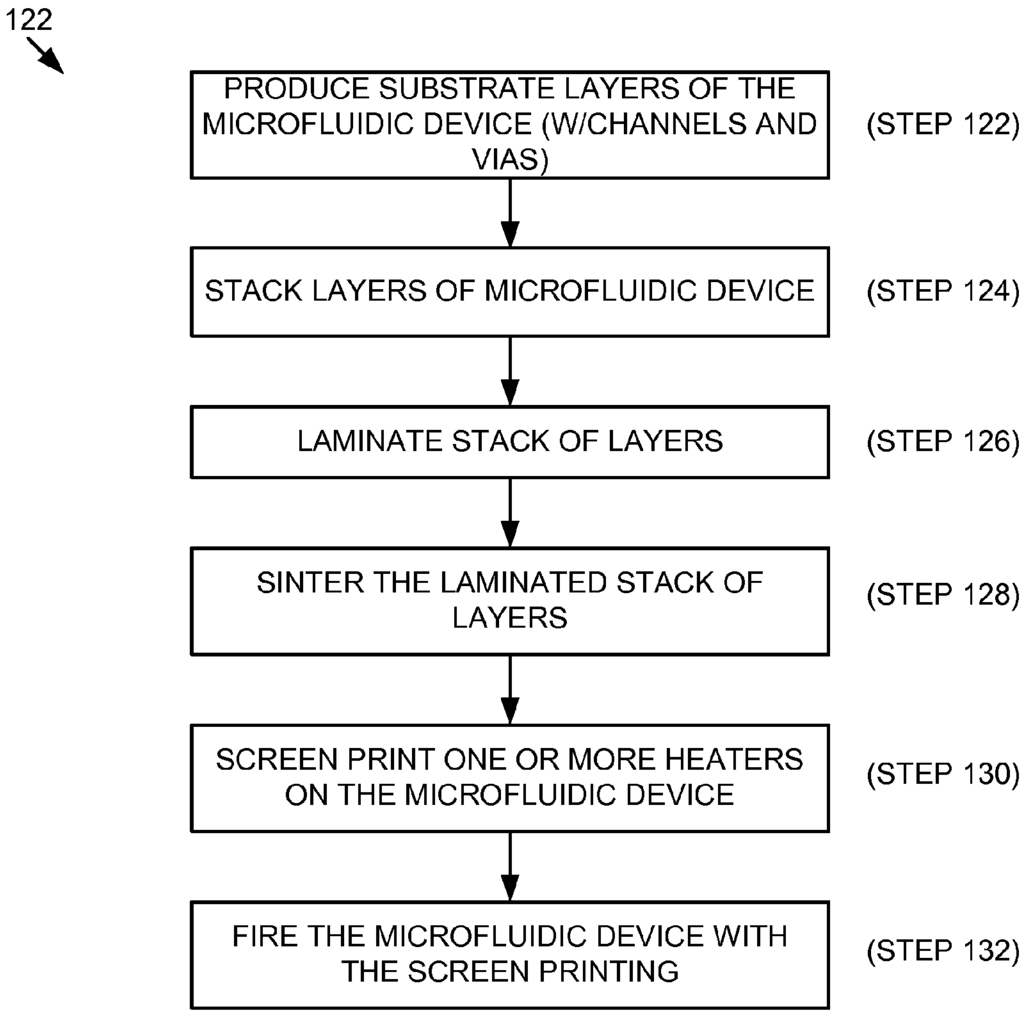
FIG. 5 is a flow diagram of an embodiment of another process for producing a microfluidic device with an integrated thermal system that produces a thermal gradient within a fluidic channel in the microfluidic device.

FIG. 5 shows an embodiment of another process 120 for producing a microfluidic device with an integrated, thermal gradient-producing thermal system. In this embodiment, the layers of the microfluidic device are produced (step 122), with a fluidic channel for use as a chromatographic column and, optionally, one or more other channels to operate as thermal breaks. Similar to the process 100 of FIG. 4, the layers are stacked (step 124), the stack of layers is laminated (step 126), and the laminated stack of layers is sintered (step 128) to harden the layers into a monolithic substrate of the microfluidic device. After the sintering of the microfluidic device, the screen-printing of the one or more heaters and any other electronic elements occurs (step 130) on an exterior surface of the microfluidic device. At step 132, the structure, comprised of the monolithic substrate and one or more screen-printed electronic elements, is fired to integrate the screen-printed electronic elements with the previously hardened microfluidic device.

While this invention has been described in conjunction with a number of embodiments, it is evident that many alternatives, modifications, and variations would be or are apparent to those of ordinary skill in the applicable arts. Accordingly, it is intended to embrace all such alternatives, modifications, equivalents, and variations that are within the spirit and scope of this invention.

What is claimed is:

1. A microfluidic device for use in separation systems, comprising:

a substrate having a fluidic channel that is a chromatography column; and a heater made of a thick film material integrated with the substrate and in thermal communication with the chromatography column of the substrate, the chromatography column having a length longer than a width and the heater configured to produce a thermal gradient along the length of the chromatography column in response to a current flowing through the heater, the heater extending lengthwise along a length of the microfluidic device.

2. The microfluidic device of claim 1, wherein the heater is made of a thick film material formed within or on the substrate.

3. The microfluidic device of claim 1, wherein the heater is trapezoidal in shape with a narrow end and a wide end, and wherein the trapezoidal shape of the heater produces a warm-to-cool thermal gradient from the narrow end to the wide end.

4. The microfluidic device of claim 1, wherein the substrate further includes one or more channels formed therein that operate as a thermal break for the thermal gradient produced by the heater.

5. The microfluidic device of claim 1, wherein the substrate further includes one or more channels formed therein that each operate as a thermal break for the thermal gradient produced by the heater, the one or more thermal breaks producing multiple thermal zones on the microfluidic device, and wherein the fluidic channel of the substrate traverses a portion of each of the multiple thermal zones.

6. The microfluidic device of claim 5, wherein the fluidic channel of the substrate has a spiral shape in one of the multiple thermal zones that transitions to a serpentine shape in another of the multiple thermal zones.

7. The microfluidic device of claim 5, wherein a pitch of the fluidic channel of the substrate varies within one or more of the multiple thermal zones.

8. The microfluidic device of claim 1, wherein the fluidic channel traverses the thermal gradient formed by the heater.

9. The microfluidic device of claim 1, further comprising a cooling element in thermally conductive contact with a first region of the substrate to cool that first region and to shape the thermal gradient within a second region of the substrate bounded by the cooling element.

10. The microfluidic device of claim 1, further comprising a temperature sensor made of thick film material integrated with the substrate of the microfluidic device and in thermal communication with the heater.

11. The microfluidic device of claim 1, further comprising one or more of a resistor, conductor, inductor, or dielectric made of thick film material integrated with the substrate.

12. The microfluidic device of claim 1, wherein the heater is a first heater and the microfluidic device further comprises a second heater spatially separated from the first heater, the first heater being disposed above the second heater, each heater being independently operable to contribute to a shape of the thermal gradient within the fluidic channel.

13. The microfluidic device of claim 1, wherein the thick film material is ferromagnetic.

14. The microfluidic device of claim 1, wherein the chromatography column is positioned in a directionally convergent manner with respect to the heater.

15. The microfluidic device of claim 1, wherein one lengthwise end of the chromatography column is closer to the heater than another lengthwise end of the chromatography column.

16. The microfluidic device of claim 15, wherein the one lengthwise end of the chromatography column that is closer to the heater is exposed to a warmer temperature than the another lengthwise end of the chromatography column.

* * * * *